United States Patent
Yaromenka et al.

(10) Patent No.: US 11,163,489 B2
(45) Date of Patent: Nov. 2, 2021

(54) WORKLOAD CLUSTERIZATION FOR MEMORY SYSTEM AND METHOD OF EXECUTING THE SAME

(71) Applicant: SK hynix Inc., Gyeonggi-do (KR)

(72) Inventors: Yauheni Yaromenka, Minsk (BY);
Aliaksei Charnevich, Minsk (BY);
Joon Mo Koo, Gyeonggi-do (KR);
Siarhei Zalivaka, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/420,746

(22) Filed: May 23, 2019

(65) Prior Publication Data
US 2019/0361628 A1  Nov. 28, 2019

Related U.S. Application Data

(60) Provisional application No. 62/675,338, filed on May 23, 2018.

(51) Int. Cl.
G06F 3/06        (2006.01)
G06F 12/02       (2006.01)
G06F 12/1018     (2016.01)

(52) U.S. Cl.
CPC ............ *G06F 3/0659* (2013.01); *G06F 3/061* (2013.01); *G06F 3/064* (2013.01); *G06F 12/0246* (2013.01); *G06F 12/1018* (2013.01)

(58) Field of Classification Search
None
See application file for complete search history.

(56) References Cited

U.S. PATENT DOCUMENTS

| | | | |
|---|---|---|---|
| 8,566,317 B1 * | 10/2013 | Ren | G06F 16/355 707/737 |
| 2010/0332846 A1 * | 12/2010 | Bowden | G06F 16/9017 713/189 |
| 2016/0216907 A1 | 7/2016 | Chang | |
| 2017/0109096 A1 | 4/2017 | Jean et al. | |
| 2017/0228188 A1 * | 8/2017 | Hassani | G06F 3/06 |

* cited by examiner

*Primary Examiner* — Gary W. Cygiel
(74) *Attorney, Agent, or Firm* — IP & T Group LLP

(57) ABSTRACT

Memory systems and components thereof perform clustering on workload items. Such a memory system comprises a memory device from which data is read and to which data is written; and a memory controller that receives from a host workload items in a workload sequence, each workload item being defined by at least a start logical block address (LBA) and a length. The memory controller merges sequential workload items in the workload sequence to constitute a single workload item; identifies a start workload item for a candidate cluster; stores the LBA and a hit count of the start workload item in a hash table of the memory controller; identifies an end workload item for the candidate cluster; determines whether the candidate cluster is found in the workload sequence more than a threshold number of times; and, if so, accepts the candidate cluster.

16 Claims, 14 Drawing Sheets

FIG. 6

Workload sequence

| LBA | 128 |
|---|---|
| Len | 16 |

Hash table /115

| # | start | ... | end | |
|---|---|---|---|---|
| 0 | | | | LBA |
| | | | | Hit_count |
| 1 | | | | LBA |
| | | | | Hit_count |
| i | 128 | ... | | LBA |
| | 1 | | | Hit_count |
| j | | ... | | LBA |
| | | | | Hit_count |
| 127 | | | | LBA |
| | | | | Hit_count |

FIG. 7

Workload sequence

| LBA | 128 |
|---|---|
| Len | 16 |

Hash table 115

| # | start | ... | end | |
|---|---|---|---|---|
| 0 | | | | LBA |
| | | | | Hit_count |
| 1 | | | | LBA |
| | | | | Hit_count |
| i | 128 | ... | | LBA |
| | 1 | | | Hit_count |
| j | | ... | | LBA |
| | | | | Hit_count |
| 127 | | ... | | LBA |
| | | | | Hit_count |

FIG. 8

Workload sequence

| LBA | 128 | 256 | 400 |
| --- | --- | --- | --- |
| Len | 16 | 16 | 16 |

Hash table 115

| # | start | | end | |
|---|---|---|---|---|
| 0 | | | | LBA |
| | | | | Hit_count |
| 1 | | | | LBA |
| | | | | Hit_count |
| ... | 128 | 400 | | LBA |
| i | 1 | 1 | | Hit_count |
| ... | | | | LBA |
| j | | | | Hit_count |
| ... | | | | |
| 127 | | | | LBA |
| | | | | Hit_count |

FIG. 9

Workload sequence

| | | | | not cluster or rejected candidate | |
|---|---|---|---|---|---|
| LBA | 128 | 256 | 400 | 500 | 700 |
| Len | 16 | 16 | 16 | 20 | 50 | cluster candidate

Hash table 115

| # | start | ... | end | | |
|---|---|---|---|---|---|
| 0 | | | | LBA | |
| | | | | Hit_count | |
| 1 | | | | LBA | |
| | | | | Hit_count | |
| i | 128 | 400 | | LBA | |
| | 1 | 1 | | Hit_count | |
| j | ... | | | LBA | |
| | | | | Hit_count | |
| 127 | | | | LBA | |
| | | | | Hit_count | |

FIG. 11

WORKLOAD CLUSTERIZATION FOR MEMORY SYSTEM AND METHOD OF EXECUTING THE SAME

CROSS-REFERENCE TO RELATED APPLICATION

This application claims the benefit of U.S. Provisional Application No. 62/675,338, filed May 23, 2018, the entire content of which is incorporated herein by reference.

BACKGROUND

1. Field

Embodiments of the present disclosure relate to scheme for clustering workload items in a memory system, particularly a flash-based memory system, and method of executing such scheme.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash allows a single machine word (byte) to be written to an erased location or read independently. The NAND-type flash memory operates primarily in memory cards, USB flash drives, solid-state drives (SSDs), and similar products, for general storage and transfer of data.

Flash-based storage, e.g., NAND-type flash memory systems, include a flash translation layer (FTL), which is firmware, one role of which is to perform address translation between logical addresses and physical addresses of the memory device, i.e., logical-to-physical (L2P) mapping, also known as logical block addressing. The FTL also performs other operations such as garbage collection and wear leveling.

File systems usually store files as a sequence of fragments, i.e., ranges of logical block addresses (LBAs). However, fragmentation downgrades read performance in a NAND flash storage, because every fragment is read separately instead of performing a sequential read. On the other hand, if there is enough historical information, LBA ranges can be merged into a single cluster, i.e., a sequence of fragments that are read or written together in the same order. However, NAND flash storage does not have enough storage and processing resources to store an entire history of commands and perform expensive calculations for these purposes.

In this context, embodiments of the present invention arise.

SUMMARY

Aspects of the present invention include memory systems, particularly flash-based NAND-type memory systems and components thereof. According to one aspect, a memory system comprises a memory device from which data is read and to which data is written; and a memory controller configured to control the memory device and to receive from a host workload items in a workload sequence, each workload item being defined by at least a start logical block address (LBA) and a length. The memory controller includes a hash table. Moreover, the memory controller is further configured to merge sequential workload items in the workload sequence to constitute a single workload item for each set of sequential workload items; identify a start workload item, among the workload items, for a candidate cluster; store the LBA and a hit count of the start workload item in the hash table; identify an end workload item, among the workload items, for the candidate cluster; determine whether the candidate cluster is found in the workload sequence more than a threshold number of times; and accept the candidate cluster when it determined that the candidate cluster is found in the workload sequence more than the threshold number of times.

Another aspect of the present invention includes methods of clustering workload items in such memory systems, which may be performed by one or more components thereof. In this regard, another aspect of the present invention entails a method of clustering workload items of a specific type in a memory system. The method comprises receiving workload items in a workload sequence, each workload item being defined by at least a start logical block address (LBA) and a length; merging sequential workload items in the workload sequence to constitute a single workload item for each set of sequential workload items; identifying a start workload item, among the workload items, for a candidate cluster; storing the LBA and a hit count of the start workload item in a hash table of the memory system; identifying an end workload item, among the workload items, for the candidate cluster; determining whether the candidate cluster is found in the workload sequence more than a threshold number of times; and accepting the candidate cluster when it determined that the candidate cluster is found in the workload sequence more than the threshold number of times.

Additional aspects of the present invention will become apparent from the following description.

BRIEF DESCRIPTION OF THE DRAWINGS

FIG. 6 is a diagram illustrating a workload sequence and the state of a hash table after a command considered as a start of a cluster candidate has been added to the hash table, in accordance with an embodiment of the present invention.

FIG. 7 is a diagram illustrating a workload sequence and the state of a hash table after a candidate command becomes the first command of a cluster candidate, in accordance with an embodiment of the present invention.

FIG. 8 is a diagram illustrating a workload sequence and the state of a hash table after a command is skipped and a last command of a cluster candidate is added, in accordance with an embodiment of the present invention.

FIG. 9 is a diagram illustrating skipping certain commands not in a current cluster candidate and having a low probability of being added to any cluster candidate, in accordance with an embodiment of the present invention.

FIG. 11 is a diagram illustrating a workload sequence in which the first command in the sequence is found again with following commands considered cluster candidates and a hash table in that state, in accordance with an embodiment of the present invention.

DETAILED DESCRIPTION

Figure 1:
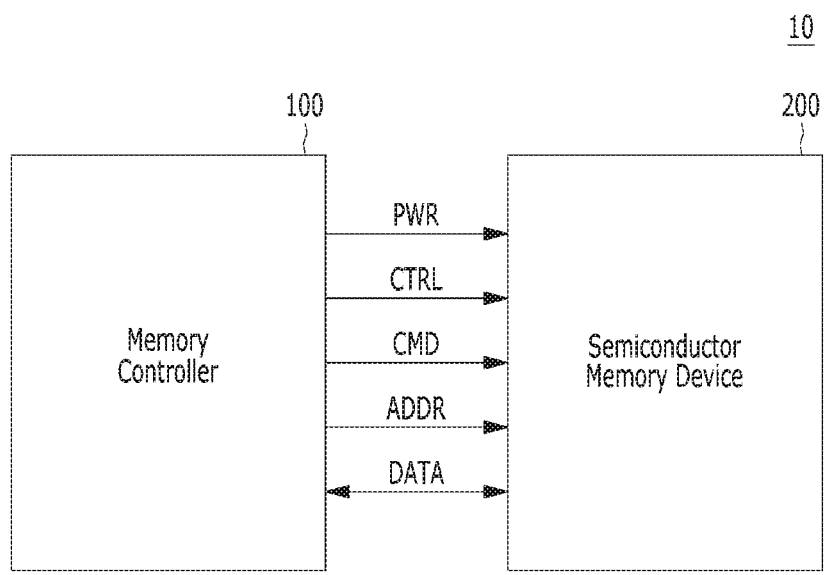
FIG. 1 is a diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. The semiconductor memory device(s) 200 are preferably flash memory device(s), particularly of the NAN D-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
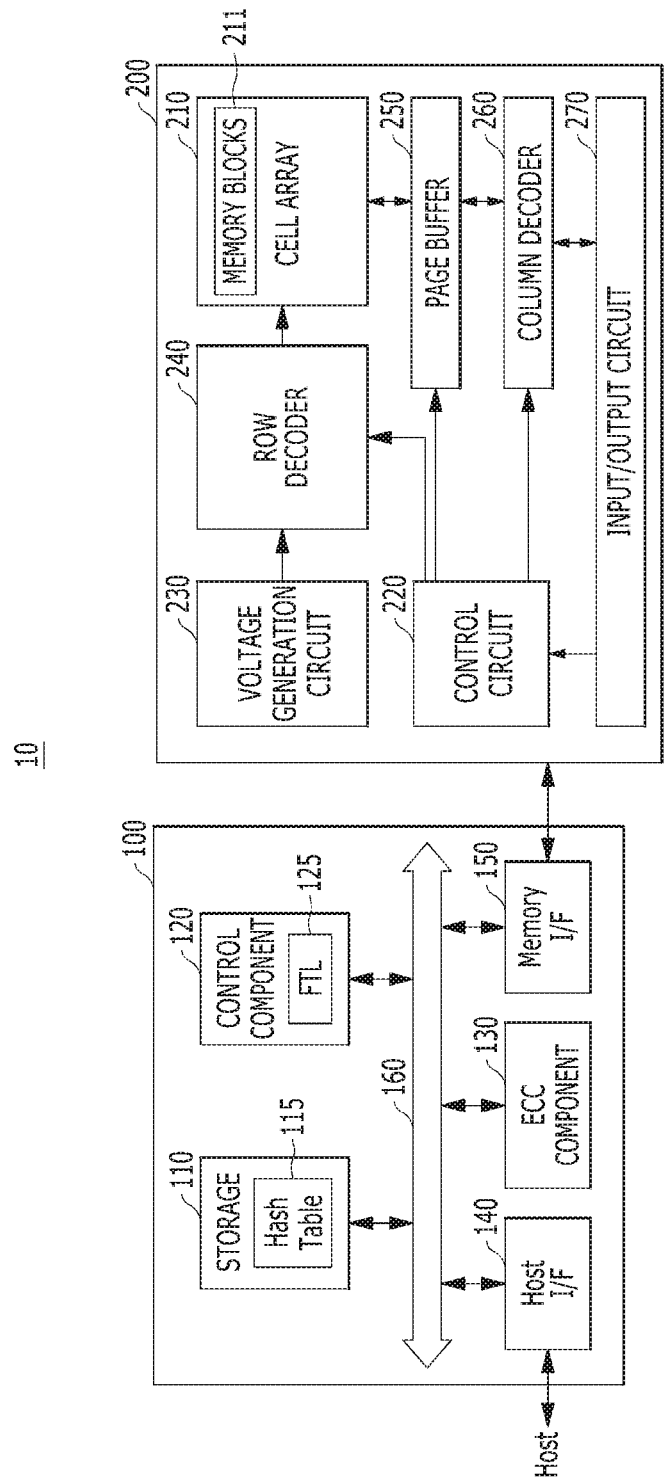
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like. The storage 110 may include a hash table 115.

The control component 120 may control general operations of the memory system 10, and a write operation or a read operation for the memory device 200, in response to a write request or a read request from the host device. The control component 120 may drive firmware, referred to as a flash translation layer (FTL) 125, to control general operations of the memory system 10. For example, the FTL 125 may perform operations such as logical-to-physical (L2P) mapping, wear leveling, garbage collection (GC), and/or bad block handling. The FTL 125 may be implemented, as firmware, in the controller 100, and more specifically, in the control component 120. The L2P mapping is known as logical block addressing.

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

The ECC component 130 may perform an error correction operation based on a coded modulation, such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). The ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component (or CPU) 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer (array) 250, which may be in the form of an array of page buffers, a column decoder 260, and an input/output circuit 270. The memory cell array 210 may include a plurality of memory blocks 211 which may store data. Subsets of the memory blocks may be grouped into respective super blocks (SBs) for certain operations. SBs and their use in the context of embodiments of the present invention are described in more detail below.

The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
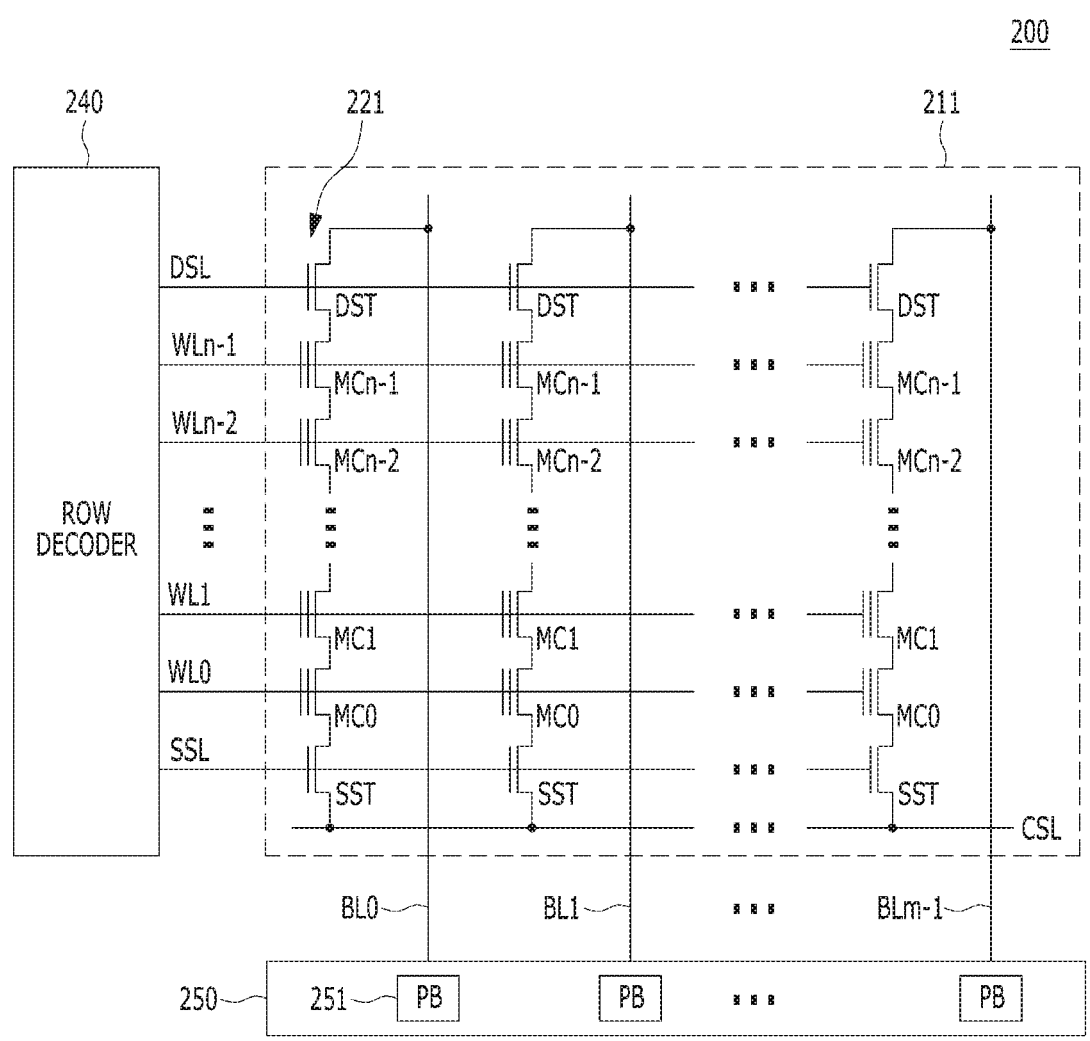
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MCI are coupled to corresponding word line WL1, etc. The group of memory cells coupled to a particular word line may be referred to as a physical page. Therefore, the number of physical pages in the memory block 211 may correspond to the number of word lines.

As previously noted, the page buffer (array) 250 may be in the form of a page buffer array including a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Embodiments of the present invention provide techniques for clustering workload items in a memory system, particularly a memory system with limited CPU and RAM resources. The memory system 10 may be configured with such limited resources. In an embodiment, the clustering operations may be performed by the memory system 10 configured as a NAND flash memory system including the memory device 200 configured as a NAND flash memory device. The workload items that are considered for clustering may be commands of a particular type, e.g., write commands or read commands.

In an embodiment, the workload may be defined as a sequence of commands that the NAND flash memory device, e.g., memory device 200, receives from a host during a period of time, e.g., the lifetime of the memory device 200. Generally, commands are processed to group select sequential commands, each defined by command type, logical block address (LBA) and command length, into a cluster candidate. The LBA and hit count of a start command and the LBA and hit count of an end command of the cluster candidate are stored in the hash table 115, which may be configured in SRAM or DRAM of the storage 110. A cluster is then formed based on the entries in the hash table 115. Information describing each cluster allows the memory system 10 to perform defragmentation, which results in improving read performance.

The cluster technique, algorithm or method generally comprises three parts: preprocessing of the commands, training, and forming a cluster. While the present invention is applicable to any type of command, e.g., write, read, discard, the cluster technique is described below in the context of write commands. Those skilled in the art will understand how to extend such teaching to other types of commands.

Each command may be identified by three variables: command type (cmd_type), start address (LEA), and command length (length), e.g., (write, 100, 5). A cluster may be defined as a set of commands that appear together in the workload sequence in the same order more than once. For example, if a sequence of commands, e.g., (write, 315, 10), (write, 1, 20), (write, 200, 5), (write, 1000, 12), appears in this order more than once, then this set of command is considered a cluster. The technique searches for clusters having a particular length (CLUSTER_LENGTH). In an embodiment, CLUSTER_LENGTH may represent a particular number of commands. In an embodiment, CLUSTER_LENGTH is a fixed number.

Figure 4:
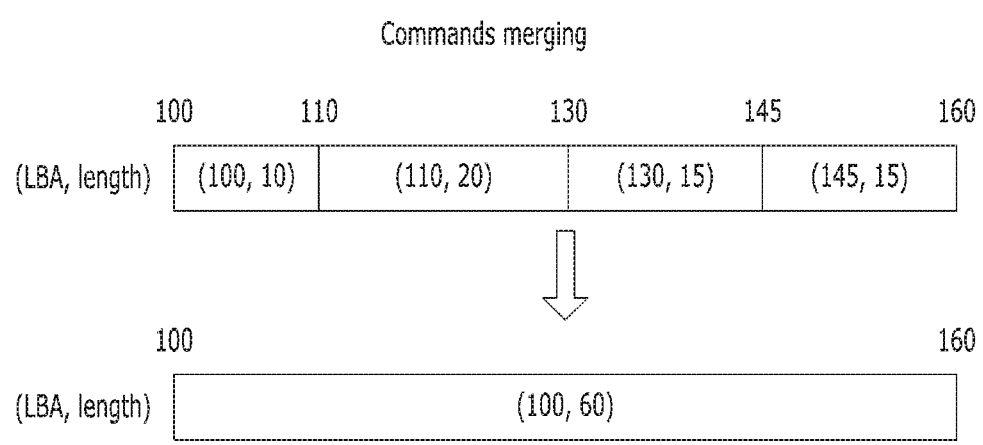
FIG. 4 is a diagram illustrating merging of commands in accordance with an embodiment of the present invention.

Preprocessing of commands includes merging certain commands. Two or more sequential commands may be considered a single command. For example, sequential write commands (100, 10), (110, 20), (130, 15), (145, 15) are equivalent to one write command (100, 60), as shown in FIG. 4. For brevity, each write command is presented with only its start address and length. The same shortened format is used for commands below. It may be assumed that the commands are write commands, although the present invention is not limited to that type of command.

When preprocessing has been performed, commands shorter than X LBAs and longer than Y LBAs are ignored. Thus, only commands that have a length of Z (X<Z<Y) LBAs are used to form a cluster. Parameters X and Y can be set by a developer to optimize the algorithm accuracy. Since the processing of commands that are longer than Y LBAs requires significantly more memory resources, such processing can be done more efficiently by another caching algorithm (e.g., least recently used (LRU) algorithm, least frequently used (LFU) algorithm).

The training part is described below. To optimize memory resources, the information that describes each cluster is stored in the hash table 115.

Each workload item, e.g., command, may be considered as a start of a cluster with a certain probability $P_{th}$. Therefore, to add a command to the hash table 115, the algorithm may generate a number R in the range [0, 1], which is compared to a threshold probability $P_{th}$. In this embodiment, if R is greater than $P_{th}$ and the $i^{th}$ (i=hash(LBA)) cell of the hash table 115 is empty, then the command is added to the hash table 115; otherwise, the command is skipped, i.e., not added to the hash table 115. The hash function can be implemented as a modulo operation in the simplest case or with a more complicated algorithm, e.g., polynomial or universal hash function.

Figure 5:
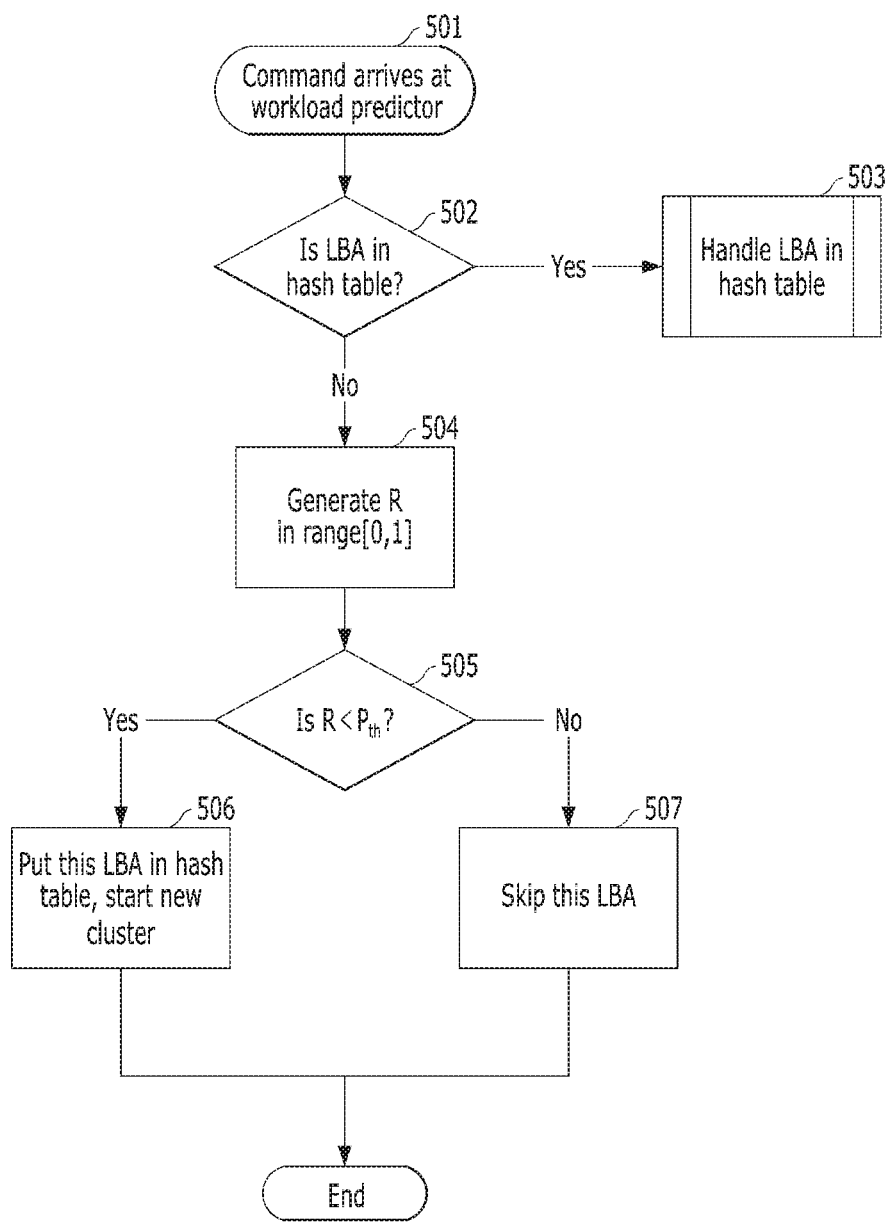
FIG. 5 is a flow chart illustrating selecting a workload item as a start of a cluster in accordance with an embodiment of the present invention.

An embodiment of a process of selecting a command as the start of a cluster is illustrated in the flow chart of FIG. 5. At step 501, a command arrives at a workload predictor, which may be configured as part of the control component 120. At step 502, it is determined whether or not the LBA of that command is in the hash table 115, which is indicative of whether or not the command has previously been encountered in the workload sequence. If so, the LBA is handled within the hash table 115 (step 503). If not (no at step 502), random number R in the range [0, 1] is generated at step 504. At step 505, it is determined whether or not R<$P_{th}$.

If "Yes" at step 505, the LBA of the received command is added to the hash table 115 and the command is considered a first command of a new cluster (step 506). If "No" at step 505, this LBA is skipped, i.e., not added to the hash table 115 (step 507). After either step 506 or step 507, the process ends.

When a command is added to the hash table 115, the command is considered part of a cluster candidate. For example, as shown in FIG. 6, a first command in a workload sequence having a start LBA of 128 and a length (Len) of 1.6 is added to the hash table, as the first command of a selected cluster candidate. The LBA (128) of that command and its hit count, which is 1 here, are added to a cell of the hash table 115. Thus, FIG. 6 shows the state of the hash table 115 after a candidate cluster has been selected and has a first command. It is noted that next CLUSTER_LENGTH commands (two commands, namely, (256, 16) and (400, 16) in this example) are not considered as the start of a cluster. CLUSTER_LENGTH is an integer number, and is 3 in this example.

When storing a command LBA, a cell may be in one of three possible states: Unknown, Rejected and Accepted. Unknown may indicate that the number of processed commands in the workload is less than K or the LBA of the first command appears less than D1 times. K is an integer number representing the minimal number of processed commands required to change the state of the cluster to Rejected. D1 is an integer number representing the minimal number of times start of the cluster candidate is met in the workload. Rejected may indicate the number of commands in the candidate cluster is greater than K and both start of the cluster and end of the cluster appear less than D2 times (at the same time start of the cluster may appear more than D1 times). D2 is an integer number meaning a minimal number of times start of the cluster candidate and end of the cluster candidate are met in the workload. Otherwise, Accepted is indicated. The cluster is accepted if and only if it was not rejected previously and both start of the cluster and end of the cluster appear no less than D2 times. For example, assume that a new command is to be added to the hash table 115 and hash(LBA)=j. If the $j^{th}$ cell of the hash table 115 is not empty and is in the Rejected state, it should be cleared. Otherwise, the new command should be skipped. When a new command LBA with the same hash value as another command LBA already in the hash table 115 is considered as a candidate, the status of the existing LBA entry is checked. If the status of the existing LBA is Unknown or Accepted, the new LBA is not added to the hash table 115, even though its probability R is above the threshold $P_{th}$.

The parameters K, D1 and D2 are tuning parameters, which may be determined and adjusted by a developer to optimize accuracy of the clustering algorithm within the constraints of the memory system 10. A larger K means a larger workload may be analyzed before making a decision. However, K is constrained on the upper end of its range by limitations of the memory system 10. D1 and D2 pertain to accuracy of the algorithm. Larger D1 and D2 values indicate more certainty that a candidate is an actual cluster. The constraint on K, however, constrains D1 and D2. If D1 and D2 are increased too much, it would be difficult to detect a cluster because the hit count would not reach those values within K commands.

In addition to the state and LBA, each cell of the hash table 115 may contain the number of times that a stored command has been encountered or found during the training stage (hit_count), and the number of processed LBAs before the stored command (hit_first_time). These items of information may be stored in an array in each cell. The command is to be added to this array after cluster length commands have been processed.

To avoid considering a random write command as the end of the cluster, this array should have more than one possible end command. Also, the possible end commands in the array should be sorted in descending order with respect to their hit count values. Thus, the possible end commands are stored as an array in descending order of probability of being the end command (array_of_end_clusters). As new commands are added to the array, the least likely end commands can be removed.

Various examples are described below.

Referring to FIG. 7, a command with LBA 128 and a length of 16 in a workload sequence is considered as the first command of a cluster candidate. The LBA of this command is added to the hash table 115, along with the number of times the command has been found, which at this time is 1.

Next, shown in FIG. 8, two more commands are encountered in the workload sequence: a second command (256, 16) followed by a third command (400, 16). Information about the third command is added to the hash table 115 as the last command of the cluster candidate (end of cluster). The hit count of this last command is 1 here. The cluster candidate contains three commands, namely (128, 16), (256, 16), (400, 16); start of the cluster (128, 16) and end of the cluster (400, 16) are stored in the hash table 115.

In the next step, as shown in FIG. 9, two more commands are received in the workload sequence (500, 20) and (700, 50). These commands are rejected, i.e., not added to the hash table 115, because neither belongs to any existing cluster nor has a probability of being added that is lower than a threshold probability, i.e., $P_{th}$. Thus, after a workload sequence of five commands, a first cluster candidate is still defined by a first command (128, 16) and a last command (400, 16), information on which is included in the hash table 115.

Figure 10:
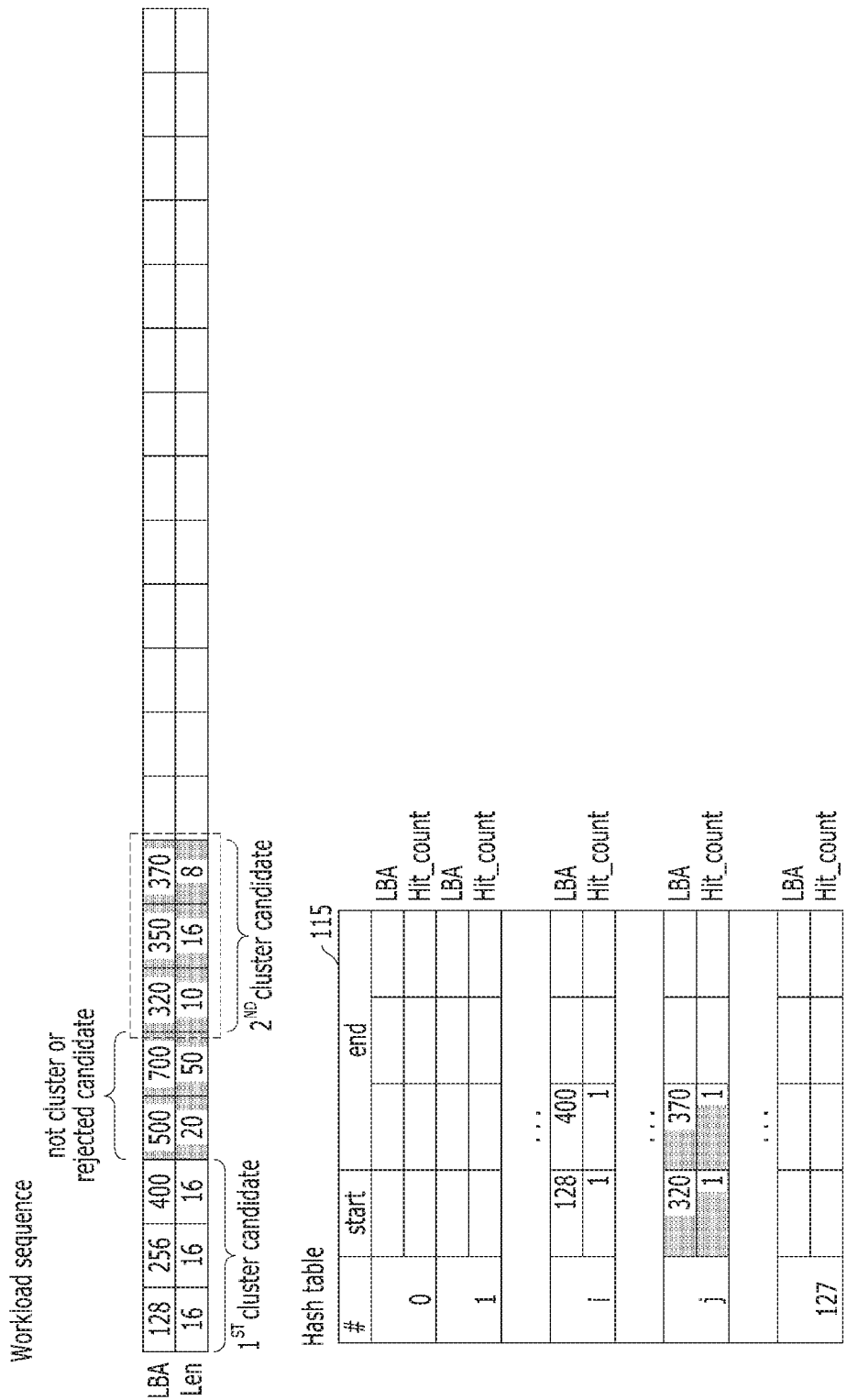
FIG. 10 is a diagram illustrating a workload sequence of cluster candidates and rejected candidates and a hash table in that state, in accordance with an embodiment of the present invention.

The process continues as shown in FIG. 10. Three more commands are received in the workload sequence, of which command (320, 10) is selected as a first command of a second cluster candidate. The following two commands (350, 16) (start of cluster) and (370, 8) (end of cluster) are considered as belonging to the second cluster, with the latter of the two defining the last command of that cluster candidate. Thus, information for the first command (320, 10) and the last command (370, 8) are added to the hash table 115 as a second cluster candidate, as shown in FIG. 10.

Figure 11:
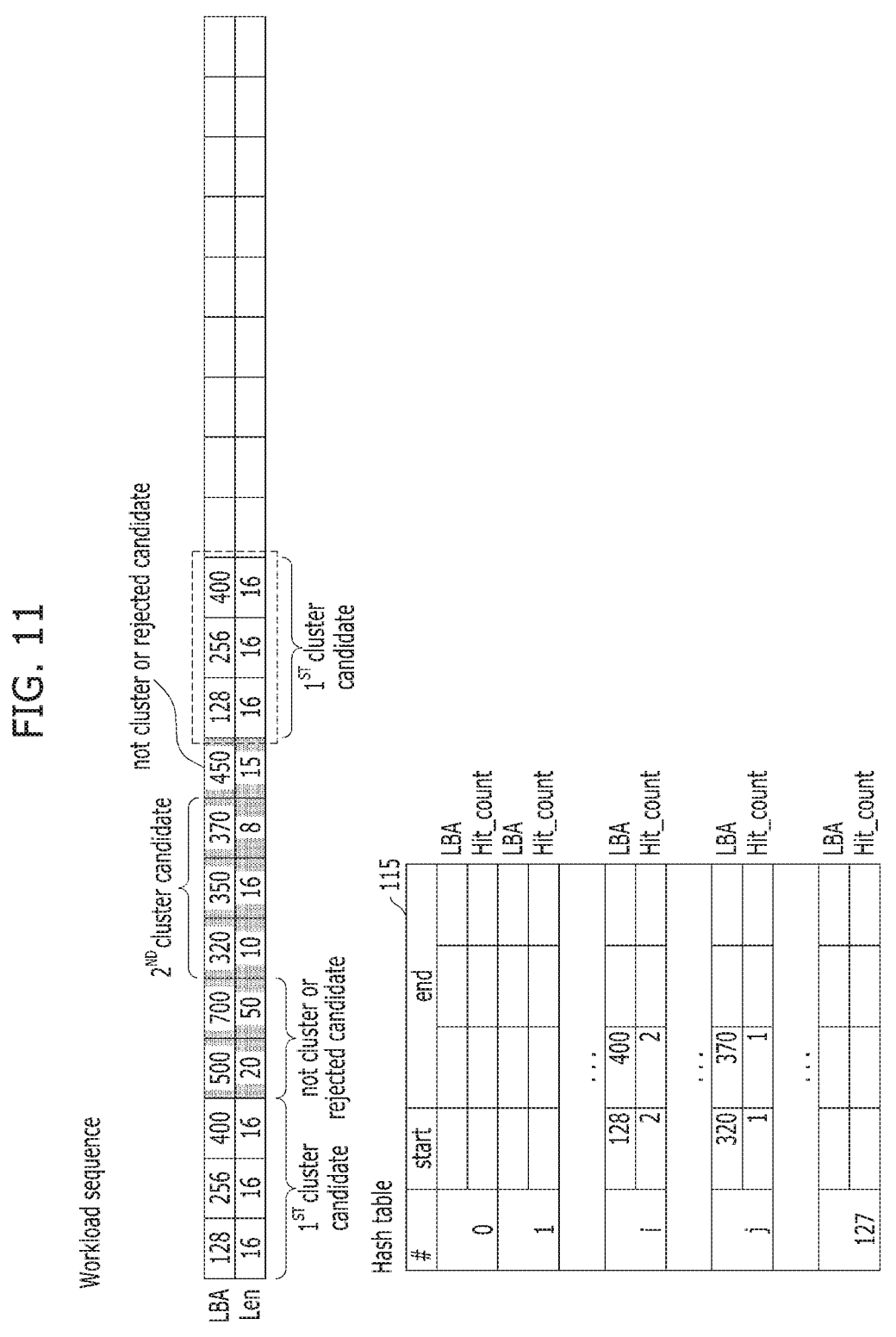

Referring now to FIG. 11, a command (450, 15) is received in the workload sequence, and then the same three commands in the first cluster candidate are encountered again in the workload sequence. Command (450, 15) is rejected as a candidate because the probability R generated by the algorithm for this command is less than $P_{th}$. However, the last three commands in the workload sequence are considered as cluster candidates. Thus, the hit count of each of command (128, 16) and (400, 16) is updated in the hash table 115, as T7 shown in FIG. 11.

Figure 12:
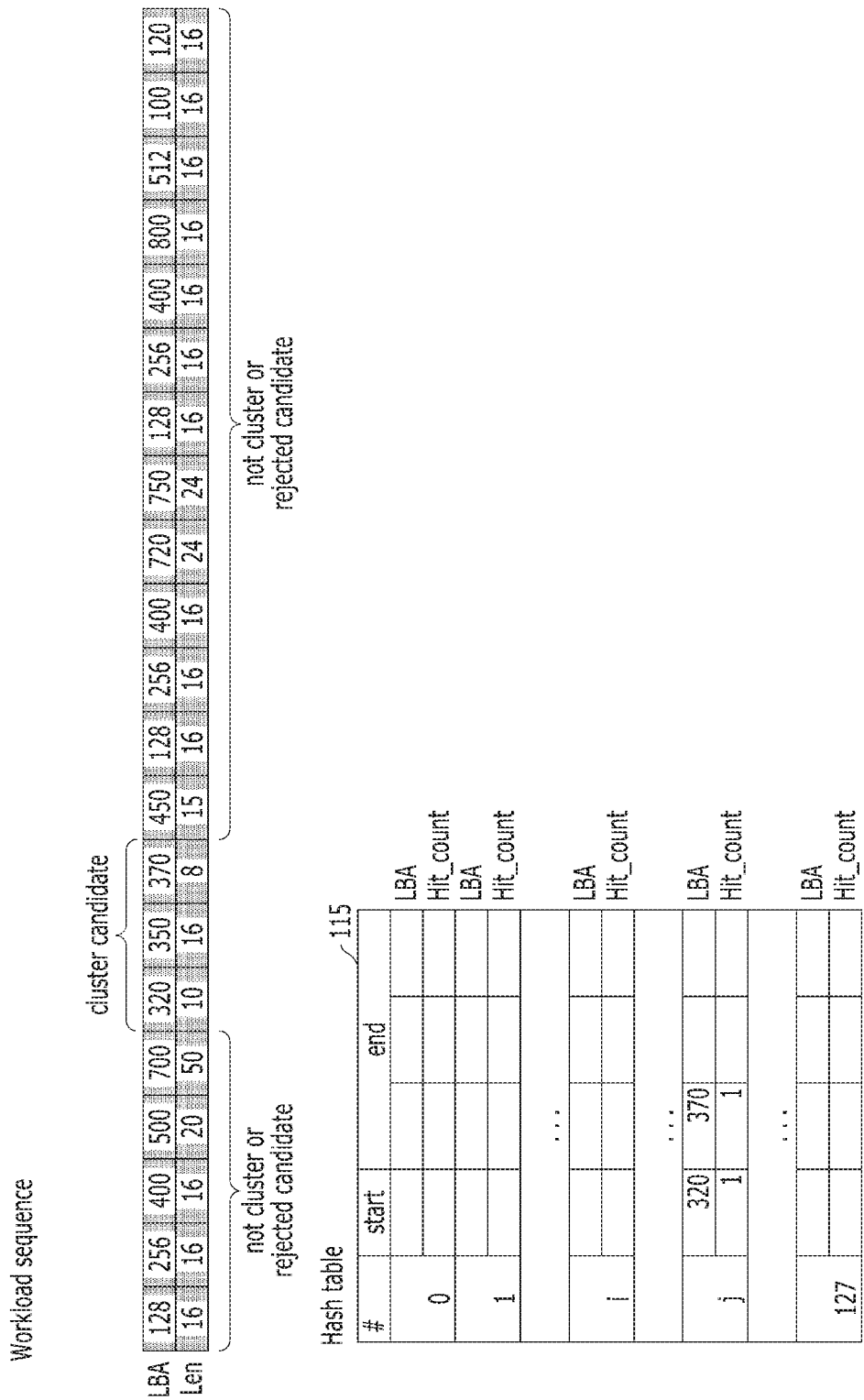
FIG. 12 is a diagram illustrating further processing of a workload sequence in accordance with an embodiment of the present invention.

The process continues to a point in which the workload sequence includes 21 commands, as shown in FIG. 12. The cluster starting from command (128, 16) is met less than D2 times for the last K commands, and the LBA with the same hash was selected as a new cluster candidate. Therefore, the cells of the hash table 115 holding information on the first cluster candidate are changed to Rejected. Every K commands the hit count for each candidate is checked. If the hit count for a given candidate is less than D2, its status is set to Rejected. During the next K commands, if a new command with the same hash value is considered as a new candidate, the previously rejected candidate is replaced with the new one. In the illustrated example, D2 is 3, as the pair (128, 16) (start of cluster) and (400, 16) (end of cluster) are encountered three times, which is not greater than D2. Therefore, cluster candidate (128, 16), (400, 16) is rejected.

FIGS. 7-1.1 and 13 illustrate another example. Steps 1-5 of this example are the same as those of the first example, which are described above in connection with FIGS. 7-11 respectively.

Figure 13:
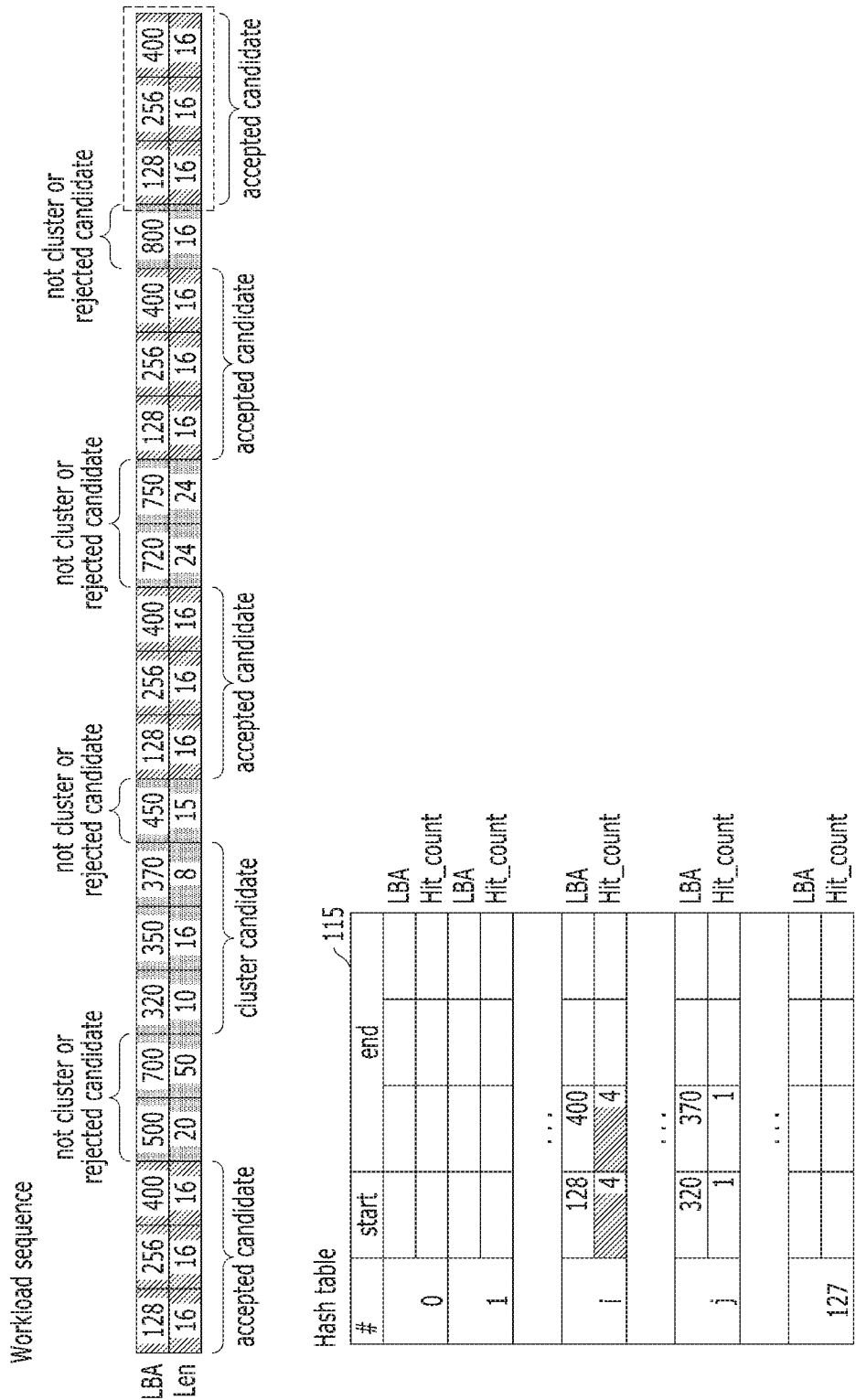
FIG. 13 is a diagram illustrating further processing of a workload sequence in accordance with another embodiment of the present invention.

The process continues to a point in which the workload sequence includes 21 commands, as shown in FIG. 13. In this example, unlike in the first example, the cluster candidate starting from command (128, 16) is met 4 times, which is more than D2 times, where D2 is 3. Therefore, this cluster is accepted, and the hash table 115 is updated accordingly.

The cluster forming stage starts right after at least one of the cells in the hash table 115 gets into the Accepted state. During the cluster forming stage, the algorithm analyzes each command, and if the command is found in the hash table 115 and a corresponding cell is the Accepted state, this command and following CLUSTER_LENGTH commands are to be stored in an array provided by the FTL. Then, LBA of an assumed end of the cluster which is stored as the first element of array_of_end_clusters is to be compared with LBA of (CLUSTER_LENGTH+1)$^{th}$ command. If the LBAs have the same value, as indicated by the comparison, a notification that a cluster is detected may be sent to FTL. Otherwise, the accumulated data may be ignored and the LBA of (CLUSTER_LENGTH+1)$^{th}$ command should be processed as described in connection with the training stage.

Figure 14:
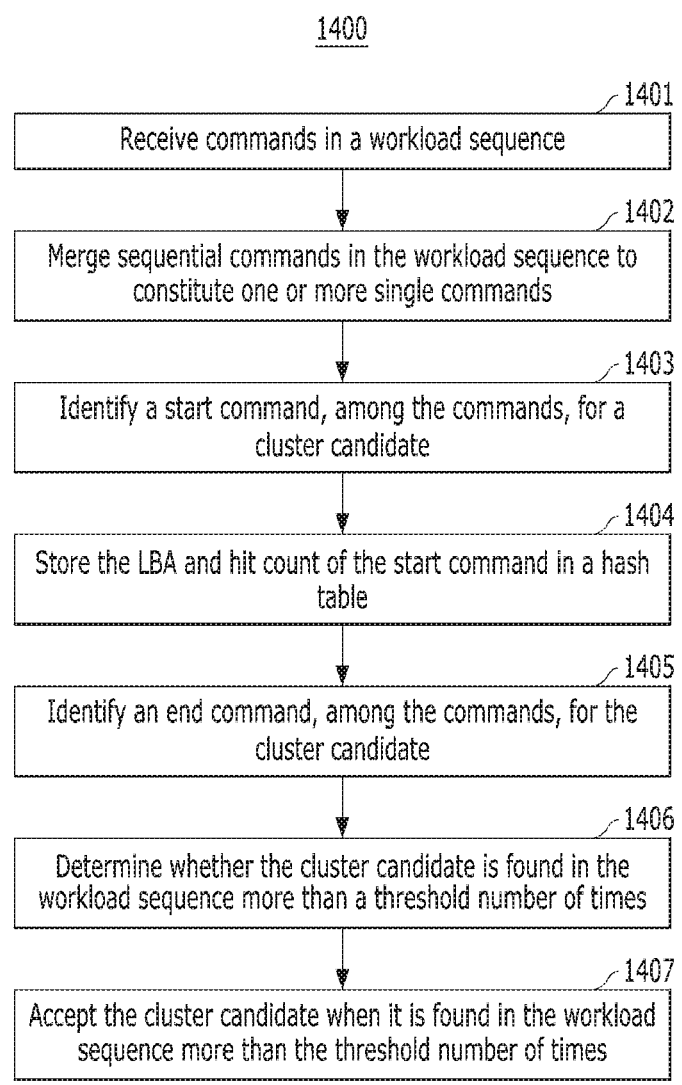
FIG. 14 is a flow chart illustrating processes of clustering workload items, e.g., commands, in accordance with embodiments of the present invention.

FIG. 14 is a flow chart describing steps in processes for clustering workload items, in accordance with embodiments of the present invention. The steps shown in flow chart 1400 are exemplary. Those skilled in the art will understand that additional and/or alternative steps may be performed, or that the order of steps may be changed, to effectuate aspects of the present invention without departing from the inventive concepts disclosed herein.

At step 1401, workload items, e.g., commands of the same type, are received in a workload sequence. To further improve the efficiency of the clustering algorithm, sequential commands in the workload sequence are merged at step 1402 to constitute one or more single commands. That is, this merging operation may be performed for each set of sequential commands.

At step 1403, among the commands in the workload sequence, a start command for a cluster candidate is identified. Such identification may be subject to a probability condition, as previously explained. Once a start command for a cluster candidate is identified, the LBA and a hit count of that command are stored in a hash table, e.g., hash table 115, at step 1404.

After one or more other commands are received and added to the cluster candidate, at step 1405 an end command is identified for the cluster candidate. As more commands are received in the workload sequence, it is examined in step 1406 to determine whether the cluster candidate appears in the workload sequence more than a threshold number of times. If so, at step 1407, the cluster candidate is accepted. Then, accepted clusters may be processed.

Various modifications may be made the above-described processing. For example, CLUSTER_LENGTH may not be fixed, but may be flexible depending on a test workload. In another embodiment, CLUSTER_LENGTH may be measured in number of LBAs instead of number of commands. In another embodiment, clusters gathered during the training stage may be merged into larger clusters to save memory resources. In another embodiment, when host command streams are used, stream identification (ID) may be used in addition to a command's LBA and length.

As the foregoing demonstrates, embodiments of the present invention provides techniques to detect clusters of workload items, e.g., commands, in a host workload transmitted to a storage device. As such, embodiments of the present invention enable defragmentation of fragmented file chunks to advantageously transform random read access to sequential read access. As a result, read performance is improved.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A memory system, comprising:
   a memory device from which data is read and to which data is written; and
   a memory controller configured to control the memory device and to receive from a host a plurality of workload items in a workload sequence, each workload item being defined by at least a start logical block address (LBA) and a length;
   wherein the memory controller is further configured to:
   identify a start workload item and an end workload item for a candidate cluster in the workload sequence, the candidate cluster including multiple workload items corresponding to a set cluster length, the start workload item being a first workload item among the multiple workload items and the end workload item being a last workload item among the multiple workload items and determined based on the first workload item and the set cluster length;
   determine whether other workload items following the end workload item and having the set cluster length are the same as the candidate cluster;
   when it is determined that the other workload items are the same as the candidate cluster, count a number indicating that the candidate cluster is found in the workload sequence;
   determine whether the counted number is more than a threshold number of times; and
   accept the candidate cluster when it determined that the counted number is more than the threshold number of times,
   wherein the memory controller assigns a threshold probability to the start workload item for the candidate cluster, generates a random number in a set range and considers the first workload item as the start workload item of the candidate cluster when the random number is greater than the threshold probability.

2. The memory system of claim 1, wherein the memory controller is configured to:
   wherein the determination of whether the other workload items following the end workload item and having the set cluster length are the same as the candidate cluster and the counting of the number indicating that the candidate cluster is found in the workload sequence are repeatedly performed for remaining workload items excluding the other workload items in the workload sequence.

3. The memory system of claim 2, wherein the memory controller is further configured to when it is determined that the other workload items are not the same as the candidate cluster, determine the other workload items as an additional candidate cluster;
   determine whether the additional candidate cluster is found in the workload sequence more than the threshold number of times; and
   accept the additional candidate cluster when it determined that the additional candidate cluster is found in the workload sequence more than the threshold number of times.

4. The memory system of claim 1, wherein the memory controller stores start LBAs of the start and end workload items in the candidate cluster in a table, and stores the counted number in the table such that the memory controller determines whether the candidate cluster is found in the workload sequence more than the threshold number of times.

5. The memory system of claim 1, wherein the memory controller is further configured to reject the other workload items as a candidate cluster when it is determined that the other workload items have a length less than the set cluster length.

6. The memory system of claim 1, wherein each workload item is a write command.

7. The memory system of claim 1, wherein the memory controller is further configured to process commands in the accepted candidate cluster.

8. The memory system of claim 1, wherein the memory system is a flash-based memory system.

9. A method of clustering workload items of a specific type in a memory system, the method comprising:
   receiving a plurality of workload items in a workload sequence, each workload item being defined by at least a start logical block address (LBA) and a length;
   identifying a start workload item and an end workload item for a candidate cluster in the workload sequence, the candidate cluster including multiple workload items corresponding to a set cluster length, the start workload item being a first workload item among the multiple workload items and the end workload item being a last workload item among the multiple workload items and determined based on the first workload item and the set cluster length;
   determining whether other workload items following the end workload item and having the set cluster length are the same as the candidate cluster;
   when it is determined that the other workload items are the same as the candidate cluster, counting a number indicating that the candidate cluster is found in the workload sequence;
   determining whether the counted number is more than a threshold number of times; and
   accepting the candidate cluster when it determined that the counted number is more than the threshold number of times,
   wherein a threshold probability is assigned to the start workload item for the candidate cluster and the first workload item is considered as the start workload item of the candidate cluster when a random number generated in a set range is greater than the threshold probability.

10. The method of claim 9,
    wherein the determining of whether the other workload items following the end workload item and having the set cluster length are the same as the candidate cluster and the counting of the number indicating that the candidate cluster is found in the workload sequence are repeatedly performed for remaining workload items excluding the other workload items in the workload sequence.

11. The method of claim 10, further comprising:
    when it is determined that the other workload items are not the same as the candidate cluster and belong to the candidate cluster, determining the other workload items as an additional candidate cluster;
    determining whether the additional candidate cluster is found in the workload sequence more than the threshold number of times; and accepting the additional candidate cluster when it determined that the additional candidate cluster is found in the workload sequence more than the threshold number of times.

12. The method of claim 9, further comprising:

storing start LBAs of the start and end workload items in the candidate cluster in a table; and storing the counted number in the table such that the memory controller determines whether the candidate cluster is found in the workload sequence more than the threshold number of times.

13. The method of claim 9, further comprising rejecting the other workload items as a candidate cluster when it is determined that the other workload items have a length less than the set cluster length.

14. The method of claim 9, wherein each workload item is a write command.

15. The method of claim 9, further comprising:

processing commands in the accepted candidate cluster.

16. The method of claim 9, wherein the memory system is a flash-based memory system.

\* \* \* \* \*